Sept. 13, 1955  K. MAYBACH ET AL  2,717,583
CONTROL SYSTEM FOR INTERNAL COMBUSTION ENGINES
Filed Nov. 9, 1951  2 Sheets-Sheet 2
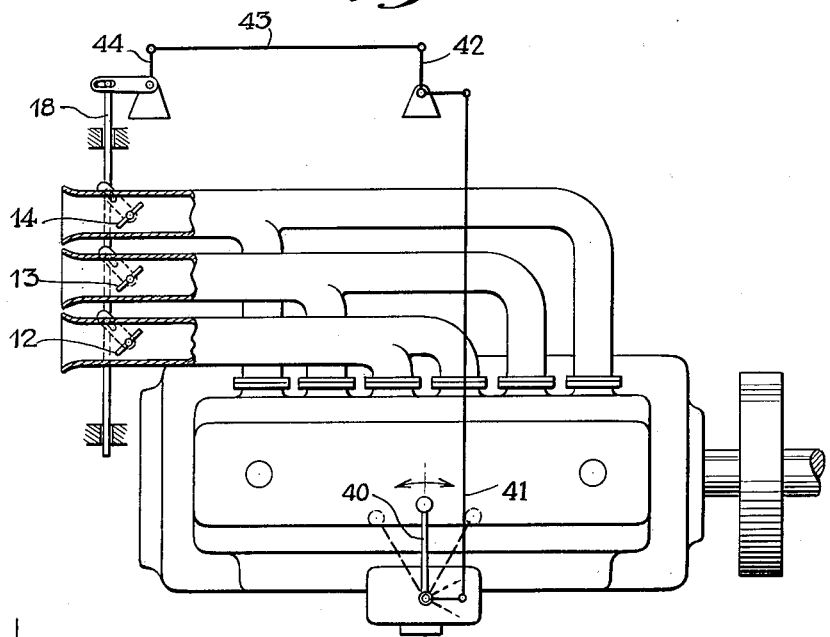
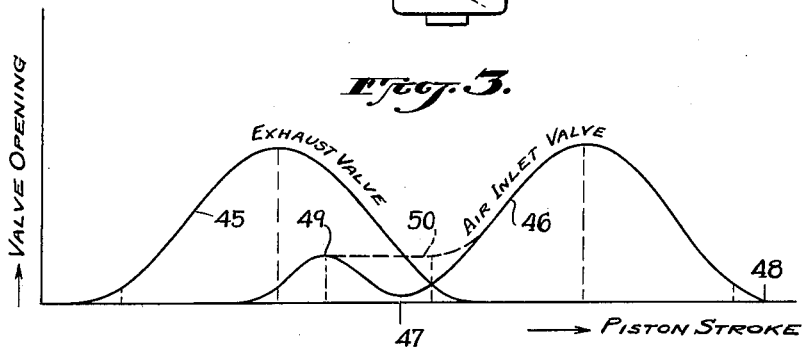
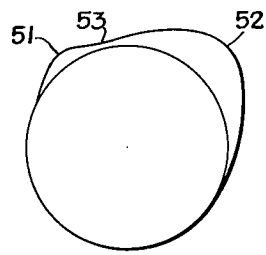
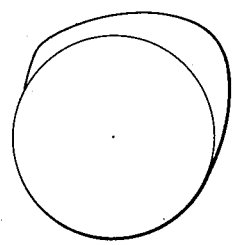
INVENTORS.
KARL MAYBACH.
MARCUS VON KIENLIN.
BY KURT STERNKOPF.
ATTORNEY.

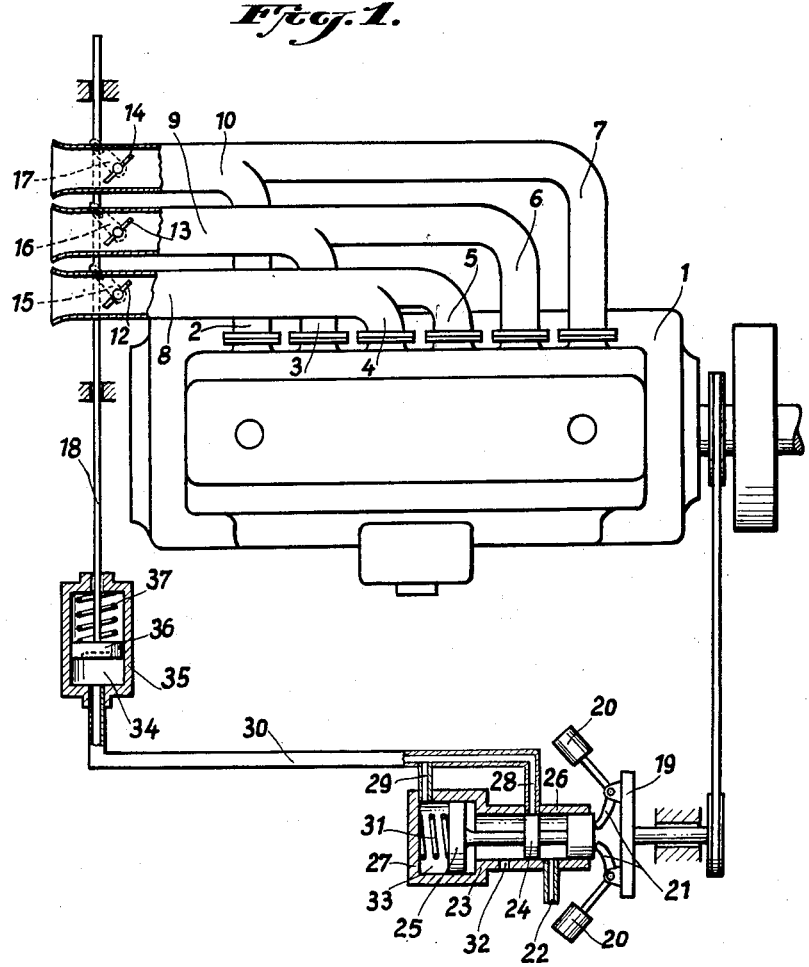

United States Patent Office 2,717,583
Patented Sept. 13, 1955

2,717,583

CONTROL SYSTEM FOR INTERNAL COMBUSTION ENGINES

Karl Maybach and Markus von Kienlin, Friedrichshafen, Germany, and Kurt Sternkopf, Vernon (Eure), France; said Von Kienlin and said Sternkopf assignors to said Maybach Application November 9, 1951, Serial No. 255,594

3 Claims. (Cl. 123—75)

The present invention relates to a control system for internal combustion engines of the type in which fuel is injected and in which the periods, during which the inlet as well as the outlet valves are open, overlap and in which the exhaust pipe is so constructed as to make efficient use of the pressure waves occurring therein. The invention relates more particularly to control systems for engines of the aforesaid type as used for the propulsion of vehicles.

It is known that alternating waves of over- and under-pressure in the exhaust conduit of internal combustion engines can be used for assisting charging and scavenging. This effect depends on the length of the exhaust pipe and on the speed of the engine and is therefore not very great during normal operation of conventional engines.

It has been proposed to improve the effect by suitable construction of the outlet portion of the exhaust pipe, for example, by making it conical. The improvement obtained is small, unless the diameter of the outlet portion is made different for different engine speeds, which, of course, cannot be done in commercial engines.

It has also been proposed to provide an orifice plate having a constant flow area at the end of the exhaust pipe to reduce the extent of travel of the pressure wave toward the engine and to double the effect of the under-pressure wave because the orifice plate reflected also the previous underpressure wave. If the orifice of the plate corresponds in size to the operating condition of the engine, efficiency of operation of the latter is greatly improved.

It is an object of the present invention to provide means in the exhaust conduit of an internal combustion engine, whereby the advantages of the above described device are obtained without experiencing the disadvantages inherent therein. The invention consists primarily in the provision of means for adjusting the flow area of the exhaust conduit of an internal combustion engine in accordance with an operating condition of the engine. These means may consist of a throttle valve in the form of a flap valve or a shutter having an adjustable orifice. According to the invention, adjustment or actuation of the throttle means is made responsive to the speed of the engine or to the degree of fuel charge thereinto, or is made responsive to both.

It is a further object of the invention to provide mechanisms for adjusting throttle means in the exhaust conduit of an internal combustion engine in dependence on an operating condition of the engine, for example, its speed or the amount of fuel supplied to the engine, or both. These mechanisms are either mechanical or comprise a fluid pressure actuated servomotor for actuating the throttle means, the fluid pressure being controlled by a governor which is responsive to the speed of the engine or by a valve controlling supply of fluid to the servomotor and actuated by means which also actuate the fuel supply to the engine.

The air flow through the cylinders at the upper dead-center position of the pistons of an engine which is equipped according to the invention is much greater than that in conventional engines, without providing special scavenging and charging means. The increased air flow assures more effective removal of the exhaust gas and better cooling of the interior wall of the compression chamber, of the valve seats, and adjacent parts, and increases the output of the engine.

It is a further object of the invention to make the aforedescribed system adaptable to use not only in connection with Otto cycle engines but also with diesel engines. If the invention is applied to diesel engines, the conventional means for controlling the inlet valve are so constructed that the inlet valve is more open at or near the upper dead-center position of the piston than in conventional diesel engines, the opening amounting, according to the size of the engine, for example, to 3 mm. According to the invention, the control means for the inlet valve may be so constructed that the inlet valve is opened to the desired extent, say 3 mm., already during part of the exhaust stroke and is partly closed at the upper dead-center position of the piston, making a pocket in the piston unnecessary and avoiding undesired configurations of the combustion space. To accomplish this, the invention provides for an additional cam on the cam actuating the inlet valve.

Further and other objects of the present invention will be hereinafter set forth in the accompanying specification and claims, and shown in the drawings which, by way of illustration, show what we now consider to be preferred embodiments of our invention.

In the drawings:

Fig. 1 is a diagrammatic, part sectional view of a control system for an internal combustion engine according to the invention;

Fig. 2 is a diagrammatic, part sectional view of a modified control system according to the invention;

Fig. 3 is a diagram showing the movement of the inlet and exhaust valves of an internal combustion engine controlled according to the invention;

Fig. 4 is a diagrammatic illustration of a cam for producing the movements shown in Fig. 3;

Fig. 5 is a diagrammatic illustration of a modified cam for producing the movements shown in Fig. 3.

Like parts are designated by like numerals in all figures of the drawings.

Referring more particularly to Fig. 1 of the drawings, numeral 1 designates a six-cylinder internal combustion engine having exhaust conduits 2 to 7, conduits 4 and 5 being combined in exhaust pipe 8, conduits 3 and 6 in pipe 9, and conduits 2 and 7 in pipe 10. The exhaust pipes 8, 9, 10 are provided with flap valves 12, 13, 14, respectively, individually having levers 15, 16, and 17, respectively, which are connected to an actuating rod 18. Movement of the latter is made responsive to the speed of the engine 1 by means of a centrifugal governor 19 which is driven by the shaft of engine 1. Fly weights 20 are connected to two-arm levers whose free arms 21 actuate a control valve 23 for controlling the flow of a pressure medium to and from a servomotor 35 which operates rod 18. The control valve 23 comprises a control piston 24 and a pressure piston 25, both pistons being interconnected and movable in cylinders 26 and 27, respectively, which are also connected and communicate with each other. One end of cylinder 27 is closed, a spring 31 being interposed between the closure and piston 25. Pressure fluid is admitted to cylinder 26 through conduit 22 and relieved therefrom through opening 32, which is disposed between pistons 24 and 25. The pressure fluid is conducted to and from the servomotor 35 through conduit 30 which is connected with cylinder 26 through conduit 28 and with cylinder 27 through conduit 29.

Conduit 30 terminates in cylinder 34 of servomotor 35. Cylinder 34 contains a piston 36 which is connected with the lower end of rod 18 and must be moved by the pressure fluid against the action of a spring 37.

In the position of the mechanism shown in Fig. 1, the engine 1 operates at medium speed. The throttle valves 12 to 14 in the exhaust pipes 8 to 10 are in an intermediate position which has been set by the governor 19 through control valve 23, piston 36, and rod 18.

When the engine speed increases, fly weights 20 move outward and arms 21 press pistons 24 and 25 in cylinders 26 and 27 to the left in Fig. 1. This causes flow of pressure fluid from conduit 22 into conduit 28 as soon as the right edge of piston 24 opens conduit 28. The pressure fluid flows from conduit 28 not only into conduit 30 but also through conduit 29 into chamber 33 at the left side of piston 25. The pressure built up in chamber 33 together with the action of spring 31 returns pistons 25 and 24 to the right until the port connecting conduit 28 with cylinder 26 is closed by piston 24.

The pressure in conduit 30 is also transmitted into cylinder 34 and moves piston 36 and rod 18 upward against the action of spring 37, thereby further opening valves 12 to 14 in accordance with the increased speed of the engine.

When the speed of the engine is reduced, the governor 19 permits spring 31 to move pistons 24 and 25 to the right in Fig. 1 so that the left edge of piston 24 opens conduit 28 and the pressure fluid flows from conduit 30 through conduit 28 into cylinder 26 and leaves the latter through port 32. The reduced pressure in conduit 30 and consequently in cylinder 34 permits spring 37 to press piston 36 and rod 18 down, reducing the openings of valves 12 to 14. This effect lasts until equilibrium is restored between the action of governor 19 and of spring 31 together with the pressure in chamber 33.

The system according to the invention effects automatic control of the flow areas of the exhaust pipes 8 to 10 according to the speed of the internal combustion engine.

Control of the flow area of the exhaust pipes may also be effected in accordance with another operating condition of the engine, for example, the degree of fuel charge to the engine. Such a system is illustrated in Fig. 2. Numeral 40 designates a lever for controlling the fuel supply to the engine. Lever 40 is connected through rod 41, bellcrank lever 42, rod 43, and bellcrank lever 44 with rod 18 which actuates valves 12 to 14 as in Fig. 1. Fig. 2 illustrates the mechanism in a position for medium engine speed. If lever 40 is moved clockwise for increasing the speed of the engine, linkage 41 to 44 moves rod 18 upward for further opening of valves 12 to 14. Movement of lever 40 to the left or counter-clockwise causes closing of the valves.

Instead of combining the exhausts of two cylinders in one exhaust pipe, three cylinders may be combined. In motors having a small number of cylinders, for example, two, a throttle valve may be provided in the exhaust pipe of each cylinder.

The ordinates of the curve designated by numeral 45 in Fig. 3 illustrate the positions or openings of the exhaust valve of a conventional diesel engine using for abscissae the stroke of the power piston. The ordinates of the curve designated by numeral 46 and extending between points 47 and 48 show the positions or openings of the inlet valve of the same engine. In order to obtain the desired pressure wave effect from the exhaust conduit, the inlet valve is opened according to the invention while the exhaust valve is still open, i. e. the inlet valve is moved as indicated by line 49. The extent of the advance opening of the inlet valve according to the invention is determined by the compression space which is inherently very small in diesel engines. The advance opening of the inlet valve must be greatest before the working piston reaches the upper dead-center position and must again be reduced to an extent determined by the height of the compression space when the piston has reached its upper dead-center position. It has been found that satisfactory conditions are obtained if the advance opening amounts to no more than one-third of the total opening stroke of the inlet valve.

For smooth operation of the mechanism actuating the inlet valve, it would be desirable if the inlet valve, after having reached maximum advance opening position, would stay in this position until it is further lifted to full open position, as indicated by dotted line 50 in Fig. 3. This, however, necessitates arrangement of a pocket in the top of the working piston, which pocket, unfortunately, makes the configuration of the combustion space less favorable.

Fig. 4 illustrates the configuration of a cam for actuating the inlet valve of a diesel engine according to lines 49, 46 in Fig. 3. It has an advance cam 51 and a main cam 52, the latter being of conventional configuration. The transition from the advance cam to the main cam is such that the inlet valve is partly closed after its advance opening when the working piston is in its upper dead-center position, i. e. there is a saddle 53 between the two cams. Fig. 5 illustrates a cam for controlling the inlet valve which cam is so formed that the valve stays in its advance open position until it is fully opened without being intermediately closed or partly closed when the working piston is in its upper dead-center position. The cam according to Fig. 5 effects actuation of the inlet valve according to the first part of line 49, dotted line 50, and the major part of line 46 in Fig. 3. Means including a cam for actuating the inlet and exhaust valves of internal combustion engines are known in the art as evidenced, for example, by the United States Patent No. 1,609,149 to Wilkinson and are therefore not illustrated.

While we believe the above described embodiments of our invention to be preferred embodiments, we wish it to be understood that we do not desire to be limited to the exact details of method, design, and construction shown and described, for obvious modifications will occur to a person skilled in the art.

We claim:

1. In an internal combustion engine having a plurality of cylinders, each cylinder having a positively controlled exhaust valve and an air inlet valve which are both open during a portion of the operating cycle, the air inlet valves receiving air of atmospheric pressure; an exhaust pipe connected with two and not more than three cylinders, the exhaust gas moving in said exhaust pipe as a solid mass adapted to transmit a pressure impulse, upon opening of an exhaust valve, from the exhaust valve to the outer end of the exhaust pipe and to transmit a subpressure impulse from the outer end of the exhaust pipe back to the exhaust valve producing, upon opening of an air inlet valve, a substantial pressure drop between the air inlet valve and the engine cylinder, adjustable flow area control means in said exhaust pipe, an element whose position substantially corresponds to the speed of the engine, actuating means interconnecting said element and said control means, and cams for individually actuating the air inlet valves, said cams individually having an advance cam portion for partly opening the inlet valve before the working piston of the internal combustion engine reaches the upper dead-center position, a main cam portion for fully opening the inlet valve, and a saddle portion between said cam portions for partly closing the inlet valve when the working piston of the engine is in its upper dead center position.

2. In an internal combustion engine as defined in claim 1, a speed governor, said element being connected with said speed governor for changing the position of the element by said governor.

3. In an internal combustion engine as defined in claim 1, a fuel supply control device, said element being part of said control device.

References Cited in the file of this patent

UNITED STATES PATENTS

| | | |
|---|---|---|
| 933,906 | Illy | Sept. 14, 1909 |
| 2,305,946 | Wilson et al. | Dec. 22, 1942 |
| 2,644,436 | Berlyn | July 7, 1953 |

FOREIGN PATENTS

| | | |
|---|---|---|
| 231,156 | Great Britain | Sept. 10, 1926 |
| 262,044 | Great Britain | Feb. 2, 1928 |
| 519,806 | Great Britain | Apr. 15, 1940 |
| 542,429 | Great Britain | Jan. 8, 1942 |
| 561,932 | Great Britain | June 12, 1944 |
| 572,724 | Great Britain | Oct. 22, 1945 |